United States Patent
Kuwata

(10) Patent No.: US 7,990,416 B2
(45) Date of Patent: Aug. 2, 2011

(54) IN-VEHICLE MOUNT DISPLAY CONTROLLER, IN-VEHICLE MOUNT DISPLAY DEVICE, DISPLAY CONTROL METHOD, CONTROL PROGRAM AND RECORDING MEDIUM

(75) Inventor: Hideki Kuwata, Tokyo (JP)

(73) Assignee: Clarion Co., Ltd., Bunkyo-ku, Tokyo (JP)

( * ) Notice: Subject to any disclaimer, the term of this patent is extended or adjusted under 35 U.S.C. 154(b) by 1654 days.

(21) Appl. No.: 10/557,485

(22) PCT Filed: May 21, 2004

(86) PCT No.: PCT/JP2004/006949
§ 371 (c)(1),
(2), (4) Date: Nov. 21, 2005

(87) PCT Pub. No.: WO2004/103775
PCT Pub. Date: Dec. 2, 2004

(65) Prior Publication Data
US 2007/0040910 A1 Feb. 22, 2007

(30) Foreign Application Priority Data
May 22, 2003 (JP) .................................. 2003-144739

(51) Int. Cl.
*G09B 9/00* (2006.01)
(52) U.S. Cl. ........................................ 348/148; 348/116

(58) Field of Classification Search .......... 348/116–118, 348/121, 143, 148–149; 340/937
See application file for complete search history.

(56) References Cited

U.S. PATENT DOCUMENTS

| | | | |
|---|---|---|---|
| 6,281,804 B1 | 8/2001 | Haller et al. | |
| 6,304,173 B2 | 10/2001 | Pala et al. | |
| 6,593,960 B1 | 7/2003 | Sugimoto et al. | |
| 6,597,389 B2 * | 7/2003 | Tanaka et al. .............. | 348/14.08 |
| 2002/0047900 A1 | 4/2002 | Nishiyama et al. | |

FOREIGN PATENT DOCUMENTS

| | | |
|---|---|---|
| DE | 196 39 673 | 9/1998 |
| DE | 100 30 359 A1 | 6/2000 |

(Continued)

OTHER PUBLICATIONS

European Search Report dated Feb. 15, 2010.

*Primary Examiner* — Thomas D Lee
*Assistant Examiner* — Stephen M Brinich
(74) *Attorney, Agent, or Firm* — McGinn IP Law Group, PLLC

(57) ABSTRACT

The state of a vehicle rear portion such as the state of a rear seat or the like and the state of a vehicle rear side are allowed to be easily grasped at a driver's seat, and also the state of a vehicle front side is allowed to be easily grasped at a rear seat. An in-vehicle display device 10 is equipped with a camera 13, plural monitors 12, 21, an image pickup direction detector 24 for detecting the image pickup direction of the camera 13 and outputting an image pickup direction signal, and a controller 22 for selecting any one of plural monitors 12, 21 on the basis of the image pickup direction signal, and displaying the pickup image of the camera 13 on the selected monitor.

11 Claims, 6 Drawing Sheets

FOREIGN PATENT DOCUMENTS

| | | |
|---|---|---|
| EP | 1 077 161 A2 | 2/2001 |
| JP | 59-119675 | 8/1984 |
| JP | 2001-055100 | 2/2001 |
| JP | 2002-135758 | 5/2002 |
| JP | 2003-25911 | 1/2003 |
| JP | 2003-25911 A | 1/2003 |
| WO | WO00/44589 | 8/2000 |

* cited by examiner

10

IN-VEHICLE MOUNT DISPLAY CONTROLLER, IN-VEHICLE MOUNT DISPLAY DEVICE, DISPLAY CONTROL METHOD, CONTROL PROGRAM AND RECORDING MEDIUM

TECHNICAL FIELD

The present invention relates to an in-vehicle mount display controller, an in-vehicle mount display device, a display control method, a control program and a recording medium, and particularly to an in-vehicle mount display controller, an in-vehicle mount display device, a display control method, a control program and a recording medium for displaying an image picked up by an in-vehicle mount camera on an in-vehicle mount monitor.

BACKGROUND ART

There has been hitherto known an in-vehicle mount camera system in which an in-vehicle mount camera is mounted in a vehicle to pick up an image of the surrounding of the vehicle and display an image for assisting safe driving (for example, see patent document 1).

In such an in-vehicle mount camera system, image processing is carried out on a video signal from the in-vehicle mount camera in accordance with the condition of the vehicle, and an image for assisting safe driving is displayed in accordance with the driving condition in such a style that the image is easily understandable by a driver.

Patent Document 1: JP-A-2001-55100

DISCLOSURE OF THE INVENTION

Problem to be Solved by the Invention

Recently, minivans (one box cars) have been increasingly demanded. However, the minivan has a large vehicle body size and thus it is difficult to grasp the conditions of a vehicle rear portion and a vehicle rear side such as the condition of a rear seat or the like from the driver's seat. In addition, there is also a disadvantage that it is difficult to view the scene in front of the vehicle or the scene behind the vehicle from the rear seat.

However, in the conventional in-vehicle mount camera system, the camera is secured to the end of the rear portion of the vehicle, and it is mainly used as a safety measure for backward movement of the vehicle such as putting the vehicle in the garage or the like. That is, the camera system concerned is used to grasp the surrounding condition out of the vehicle, particularly the neighborhood of the rear portion of the vehicle, and it cannot be used for the above application.

Therefore, an object of the present invention is to provide an in-vehicle mount display controller, an in-vehicle mount display device, a display control method, a control program and a recoding medium with which the conditions of the vehicle rear portion and the vehicle rear side such as the condition of the rear seat, etc. can be easily grasped from the driver's seat, and the condition of the front side of the vehicle can be also easily grasped from the rear seat.

Means of Solving the Problem

In order to solve the problem, an in-vehicle mount display controller for controlling plural monitors that can display pickup images of a camera is equipped with a display controller for selecting some of the plural monitors on the basis of the image pickup direction of the camera, and displaying the pickup images of the camera on the monitor thus selected.

In this case, the display controller may be equipped with a signal switching portion for switching a monitor as an output destination of an image pickup signal of the camera on the basis of an image pickup direction signal corresponding to the image pickup direction of the camera.

The display controller may select the monitor in accordance with a situation that the image pickup direction is any one of at least two directions of the forward direction of the vehicle, the direction to the rear seat of the vehicle and the backward direction of the vehicle.

Furthermore, the in-vehicle mount display device is characterized by comprising a camera, plural monitors, an image pickup direction detector for detecting the image pickup direction of the camera and outputting an image pickup direction signal, and a display controller for selecting any one of the plural monitors on the basis of the image pickup direction signal and displaying a pickup image of the camera on the selected monitor.

In this case, the display controller may be equipped with a signal switching portion for switching the monitor as an output destination of the image pickup signal of the camera on the basis of the image pickup direction signal.

Still furthermore, the display controller may select the monitor on the basis of any one of at least two directions of the forward direction of the vehicle, the direction to the rear seat of the vehicle and the backward direction of the vehicle.

Furthermore, a method of controlling an in-vehicle mount display device having a camera and plural monitors for displaying a pickup image of the camera is characterized by comprising an image pickup direction identifying step of identifying an image pickup direction of the camera, and a step of selecting any one of the plural monitors on the basis of the image pickup direction thus identified, and displaying the pickup image of the camera on the selected monitor.

A control program for making a computer control an in-vehicle mount display device having a camera and plural monitors for displaying a pickup image of the camera, is characterized by making the computer identify an image pickup direction of the camera, select any one of the plural monitors on the basis of the image pickup direction thus identified and display the pickup image of the camera on the selected monitor.

In this case, the control program may make the computer select the monitor on the basis of anyone of at least two directions of the forward direction of the vehicle, the direction to the rear seat of the vehicle and the backward direction of the vehicle.

Furthermore, the control program may be recorded in a computer-readable recording medium.

Effect of the Invention

According to the present invention, the state of the vehicle rear portion and the vehicle rear side such as the state of the rear seat or the like can be readily grasped from the driver's seat, and further the state of the front side of the vehicle and the state of the rear side of the vehicle can be readily grasped from the rear seat. Particularly, when the state of the vehicle rear side is checked, not only the driver on the driver's seat, but also passengers on the rear seat are not required to direct their eyes to the rear side of the vehicle, and thus they can check the state of the vehicle rear side while keeping the line of sight to the front side.

BEST MODE OF CARRYING OUT THE INVENTION

Preferable embodiments of the present invention will be described with reference to the drawings.

[1] First Embodiment

FIG. 1 is a diagram showing the construction of an in-vehicle mount display system according to a first embodiment.

An in-vehicle mount display system 10 is equipped with a front monitor 12 disposed at the front seat side of a vehicle 11, and a rear monitor unit 14 having a camera 13 which is disposed substantially at the center portion of the vehicle 11 so that a display screen can be viewed from the rear seat side.

FIG. 2 is a perspective view of the outlook of the rear monitor unit 14 when the rear monitor unit 14 is mounted on the ceiling of the vehicle. The rear monitor unit 14 has a rear monitor unit body 15. A rear monitor 21 is rotatably mounted at the lower side of the rear monitor unit body 15. A camera 13 is provided to the lower end of the rear monitor 21 so as to be rotatable in the front-and-rear direction with the axis along the right-and-left direction as a rotating axis when the rear monitor 21 is disposed so as to face the rear side of the vehicle.

FIG. 3 is a block diagram showing the construction of the rear monitor unit. The rear monitor unit 14 is equipped with the camera 13, the rear monitor 21, a controller 22, a player portion 23 and an image pickup direction detector 24. Various types of thin displayers such as a liquid crystal display, an EL display, etc. may be used as the rear monitor 21.

The controller 22 is constructed as a microcomputer having MPU, ROM, RAM, etc. In the controller 22, MPU carries out display control on the basis of a control program stored in ROM while temporarily storing data into RAM, and also carries out reproduction control of the player portion 23.

The player portion 23 reproduces an image recording medium such as DVD, CD, video tape or the like, and outputs a reproduction signal to a controller 22. Accordingly, the passengers can view not only the images at the outside of the vehicle, but also freely enjoy amusement movies, music, etc., for example. Furthermore, the image pickup direction detector 24 is a device for detecting the orientation direction (image pickup direction) of the camera. The device is constructed by a mechanical switch, an optical sensor, a proximity sensor, an encoder, etc., and outputs the output signal corresponding to the orientation direction (image pickup direction) of the camera 13 to the controller 22. Conventional elements can be used as the mechanical switch, etc. for detecting the orientation direction of the camera, and the description of the detecting method thereof is omitted.

According to the above construction, when an image pickup signal Sv is input from the camera 13, the controller 22 of the rear monitor unit 14 detects the image pickup direction of the camera 13 on the basis of the output signal of the image pickup direction detector 24, and selectively supplies the image pickup signal to any one of the front monitor 12 and the rear monitor 21 in accordance with the image pickup direction concerned or supplies the image pickup signal to both the monitors. As a result, the front monitor 12 or the rear monitor 21 to which the image pickup signal is supplied displays pickup images of the camera 13 on the basis of the image pickup signal. In this embodiment, an image pickup signal supply destination (a display destination of the images) is automatically selected in accordance with the image pickup direction of the camera. However, it is not necessarily automatically selected, however, the switching operation of the image pickup signal supply destination may be manually carried out. Alternatively, both the front monitor 12 and the rear monitor 21 may be set in advance so that the images of the camera 13 are displayed on both the monitors 12 and 21. In the case of the automatic switching operation, driver's or passenger's operation is unnecessary, and thus this is preferable because the cumbersome switching operation is not needed. An image recoding medium such as DVD or the like is inserted in the player portion 23, and when reproduction is instructed, the reproduction pictures are displayed on the rear monitor 21.

Next, a specific display mode will be described.

FIG. 4 is a flowchart showing the processing of the first embodiment.

First, the image pickup direction detector 24 detects the image pickup direction of the camera 13 (step S1). Accordingly, the controller portion 22 identifies on the basis of the output signal of the image pickup direction detector 24 whether the image pickup direction is the forward direction of the vehicle or the direction to the rear seat (step S2).

When it is judged in step S2 that the image pickup direction is the forward direction of the vehicle, the controller 22 functions as a signal switcher, and outputs the image pickup signal output from the camera 13 to the rear monitor 21. Accordingly, for example, a scene viewed from the front window which corresponds to an image in the forward direction of the vehicle is displayed on the rear monitor 21 (step S3). It is judged in step S2 that the image pickup direction corresponds to the direction to the rear seat, the controller 22 functions as the signal switcher, and outputs the image pickup signal output from the camera 13 to the front monitor 12. Accordingly, for example, a child sleeping on the rear seat which corresponds to an image in the direction to the rear seat is displayed on the front monitor 12 (step S4).

As described above, according to the first embodiment, by merely switching the image pickup direction of the camera 13, the pickup image can be displayed on the rear monitor 21 when the camera 13 is oriented in the forward direction of the vehicle, and the pickup image can be displayed on the front monitor 12 when the camera 13 is oriented in the direction to the rear seat. Accordingly, the pickup image can be easily displayed on the optimal monitor by merely switching the image pickup direction of the camera 13 by the user, and the usability can be enhanced, and the communications between the front seat and the rear seat of the vehicle can be facilitated. The switching operation of the image pickup direction of the camera may be performed by rotating the camera while the driver or the passenger takes a grip on the camera itself, or the image pickup direction of the camera may be automatically switched by providing the camera with a driving mechanism such as a motor or the like for continuously switching the orientation of the camera, disposing a control device such as a switch or the like for controlling the operation of the driving mechanism in the neighborhood of the driver's seat and the rear seat and operating the control device. The setup position of the camera is not limited to the neighborhood of the driver's seat at the ceiling portion in the vehicle, and it may be set up in the neighborhood of the side wall portion in the vehicle, for example.

[2] Second Embodiment

In the first embodiment described above, when the image pickup direction of the camera is switched between the forward direction of the vehicle and the direction to the rear seat, the monitor on which the pickup image should be displayed is switched between the front monitor and the rear monitor. However, in the second embodiment, the image pickup direction is classified into three directions, and the monitor on which the pickup image should be displayed is switched between the front monitor and the rear monitor in accordance with the image pickup direction.

FIG. 5 is a flowchart showing the processing of the second embodiment.

First, the image pickup direction detector 24 detects the image pickup direction of the camera 13 (step S11). Accordingly, the controller 22 judges on the basis of the output signal of the image pickup direction detector 24 which one of the vehicle forward direction, the direction to the rear seat and the vehicle rearward direction the image pickup direction is (step S12).

Here, FIG. 6 is a diagram showing the image pickup direction of the camera and the monitor switching operation. In this case, when the image pickup direction range of the camera 13 is equal to θ1, the controller 22 judges that the camera 13 picks up the image of the front side of the vehicle as shown in the diagram showing the image pickup direction in FIG. 6. Furthermore, when the image pickup direction range of the camera 13 is equal to θ2, the controller 22 judges that the camera 13 picks up the image of the rear seat. Still furthermore, when the image pickup direction range of the camera 13 is equal to θ3, the controller 22 judges that the camera 13 picks up the image of the rear side of the vehicle. As described above, the image pickup direction ranges can be readily detected by using a detection device such as a mechanical switch, an optical sensor, an encoder or the like.

When it is judged in step S12 that the image pickup direction is the vehicle forward direction, that is, when the image pickup direction range of the camera 13 is equal to θ1, the controller 22 functions as the signal switching portion, and outputs the image pickup signal output from the camera 13 to the rear monitor 21. Accordingly, the scene viewed from the front window is displayed as the image in the vehicle forward direction, for example (step S13).

When it is judged in step S12 that the image pickup direction is the direction to the rear seat, that is, when the image pickup direction range of the camera 13 is equal to θ2, the controller 22 functions as the signal switching portion, and outputs the image signal from the camera 13 to the front monitor 12. Accordingly, for example, a child sleeping on the rear seat is displayed as the image in the direction to the rear seat on the front monitor 12 (step S14).

When it is judged in step S12 that the image pickup direction is the rearward direction of the vehicle, that is, when the image pickup direction range of the camera 13 is equal to θ3, the control portion 22 functions as the signal switching portion, and outputs the image pickup signal output from the camera 13 to the front monitor 12. Accordingly, for example, the scene of the rear side of the vehicle which corresponds to the image in the vehicle rearward direction is displayed on the front monitor 12, and it is usable in such a case that the vehicle is backwardly put into the garage (step S15).

As described above, according to the second embodiment, by merely switching the image pickup direction of the camera 13, when the camera 13 is oriented to the front side of the vehicle or the rearward direction of the vehicle, the pickup image can be displayed on the rear monitor 21, and when the camera 13 is oriented to the rear seat, the pickup image can be displayed on the front monitor 12. By merely switching the image pickup direction of the camera 13 by the user, the image can be easily displayed on the optimal monitor. Therefore, the usability can be enhanced, and the communications between the front seat and the rear seat can be easily performed. It is needless to say that the display of the pickup image on the monitor is not limited to the above embodiment.

[3] Modification of Embodiment

[3.1] First Modification

In the foregoing description, in a case where the image pickup direction of the camera is switched, when the image pickup direction of the camera reaches a predetermined direction, the monitor for displaying the pickup image is immediately switched from the first monitor (for example, front monitor) to the second monitor (for example, rear monitor). However, there may be provided an image direction range of the camera in which no image is displayed on all the monitors when the monitor is switched from the first monitor to the second monitor. Accordingly, for example when the image pickup direction of the camera is switched from the forward direction of the vehicle to the direction to the rear seat, the pickup image in the direction to the floor of the vehicle can be prevented from being displayed.

[3.2] Second Modification

In the foregoing description, it is assumed that the camera is of a fixed focal point type. However, the camera may be a camera having a zooming function, and the zooming magnification may be switched to a predetermined zooming magnification in accordance with the image pickup direction in advance. Furthermore, the image pickup mode may be automatically switched to a night image pickup mode in which infrared image pickup is carried out in accordance with the brightness of the surrounding.

[3.3] Third Modification

In the foregoing description, the camera is allowed to be rotatable in the forward direction and the rearward direction. However, it may be constructed to be rotatable in the horizontal direction by using a universal joint or the like.

[3.4] Fourth Modification

In the foregoing description, the destination to which the image pickup signal of the camera is switched between the two monitor units, however, the destination to which the image pickup signal of the camera may be switched among three or more monitor units. Particularly, this is suitable to such a case that the position suitable to view the display image (the position of the viewer) is different among monitor units and the viewing target is also different among the monitor units.

[3.5] Fifth Modification

In the foregoing description, the control program for controlling the above operation may be stored in ROM, however, any memory device may be likewise applied in so far as it can normally function as a read only memory such as EPROM (Erasable programmable ROM), EEPROM (Electrically erasable programmable ROM), NVRAM (Nonvolatile RAM) or the like. Furthermore, the control program may be stored in an external storage device such as a hard disk, various kinds of optical discs, etc.

Furthermore, these programs may be recorded in a removable recording medium such as an optical disk or the like and then installed or downloaded through a network and then installed. In the case of download, the download may be carried out every execution.

INDUSTRIAL APPLICABILITY

According to the present invention, the state of the vehicle rear portion such as the state of the rear seat or the like and the state of the vehicle rear side can be easily grasped at the driver's seat, and furthermore the state of the front side of the vehicle can be easily grasped at the rear seat. Furthermore, the monitor on which the pickup image of the camera is displayed can be automatically switched in accordance with the image pickup direction of the camera.

Figure 1:
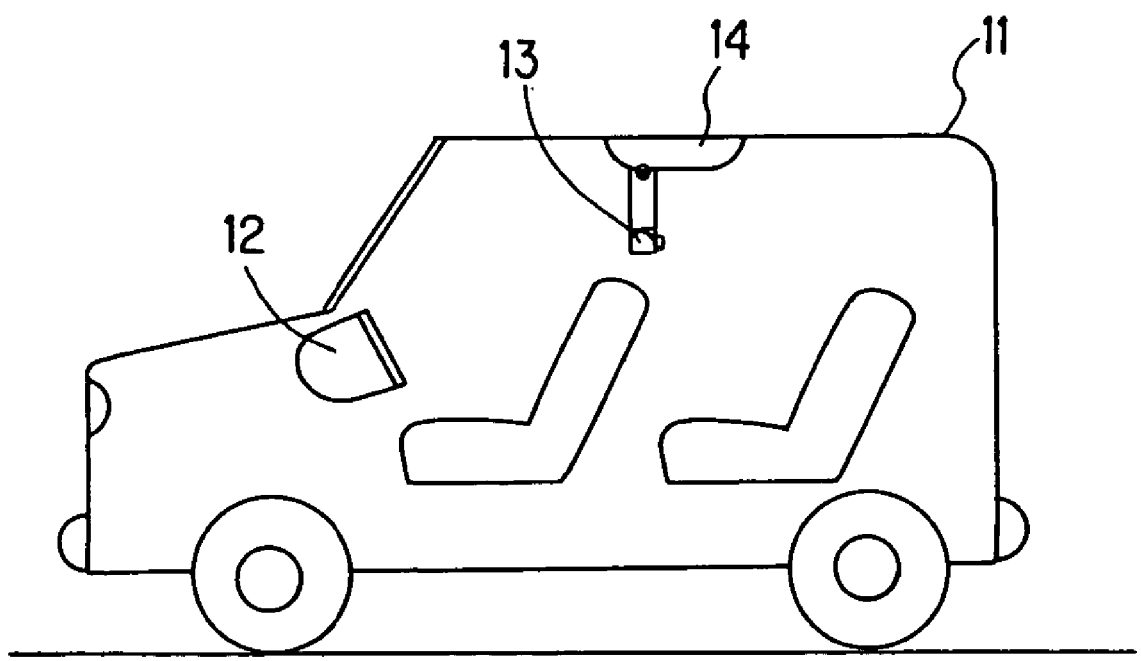
FIG. 1 is a diagram showing an in-vehicle mount display system according to a first embodiment.
Figure 2:
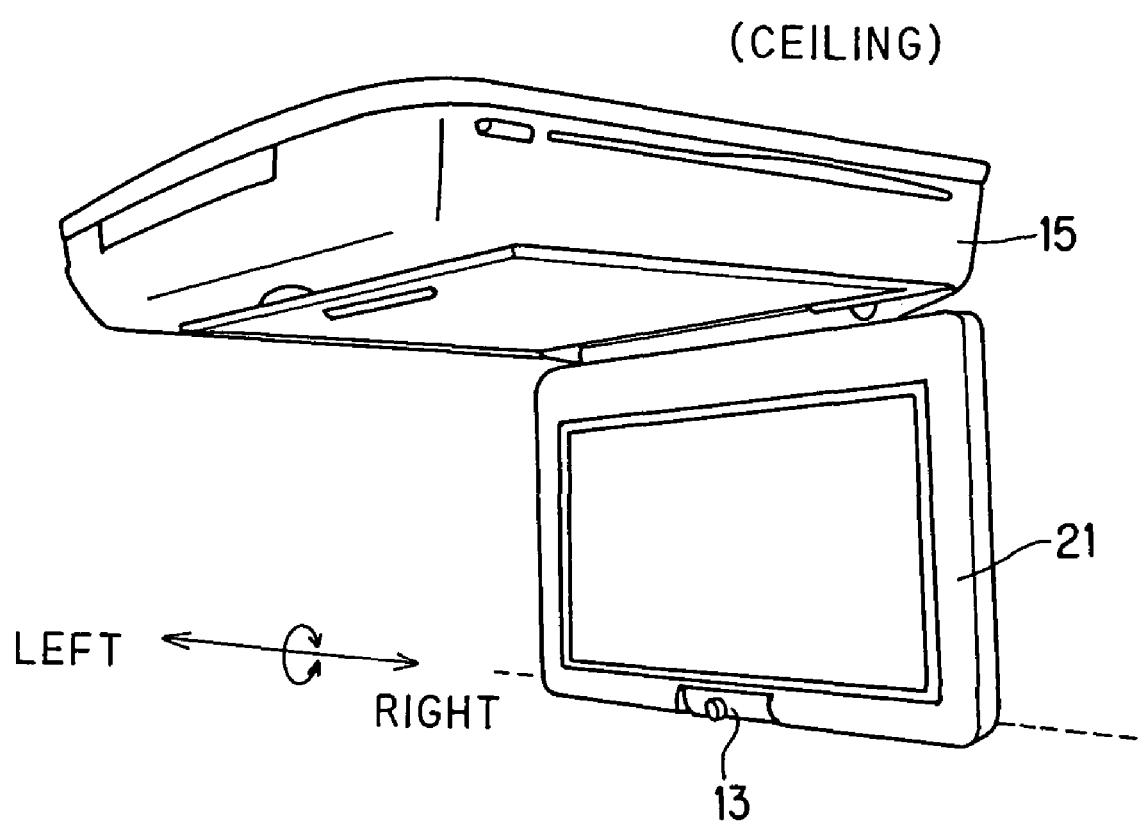
FIG. 2 is a perspective view showing the outlook when a rear monitor unit is mounted on the ceiling of the vehicle.
Figure 3:
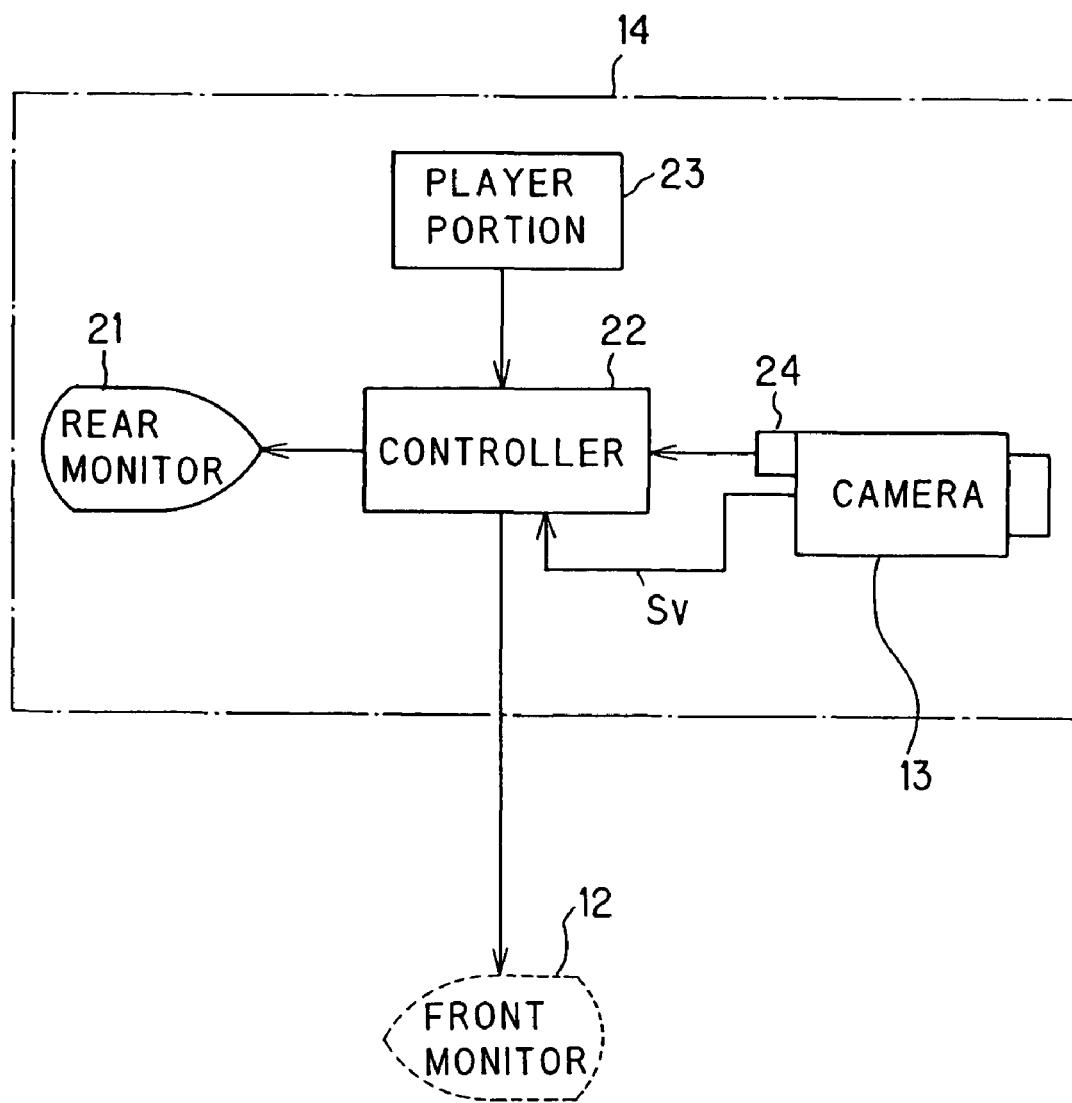
FIG. 3 is a block diagram showing the construction of the rear monitor unit.
Figure 4:
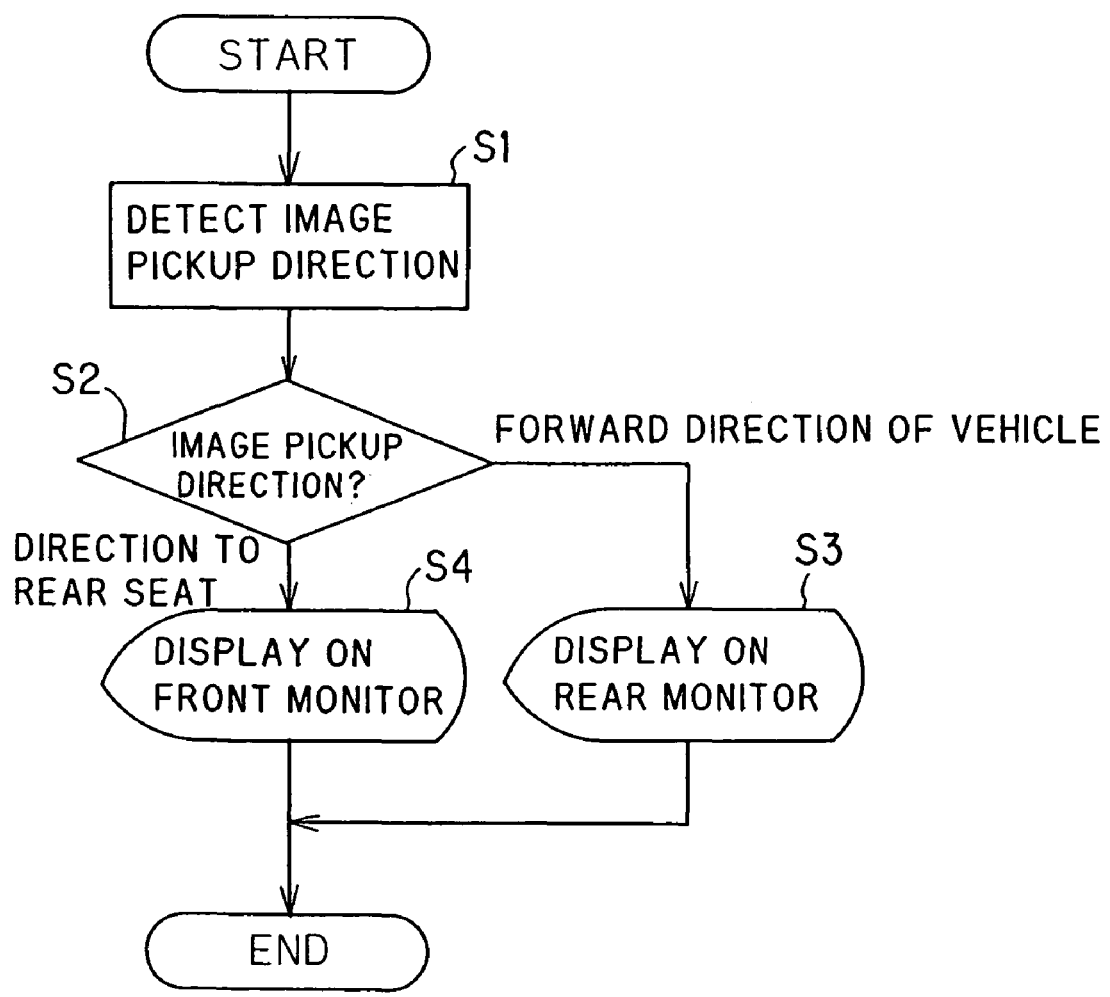
FIG. 4 is a flowchart showing the processing of the first embodiment.
Figure 5:
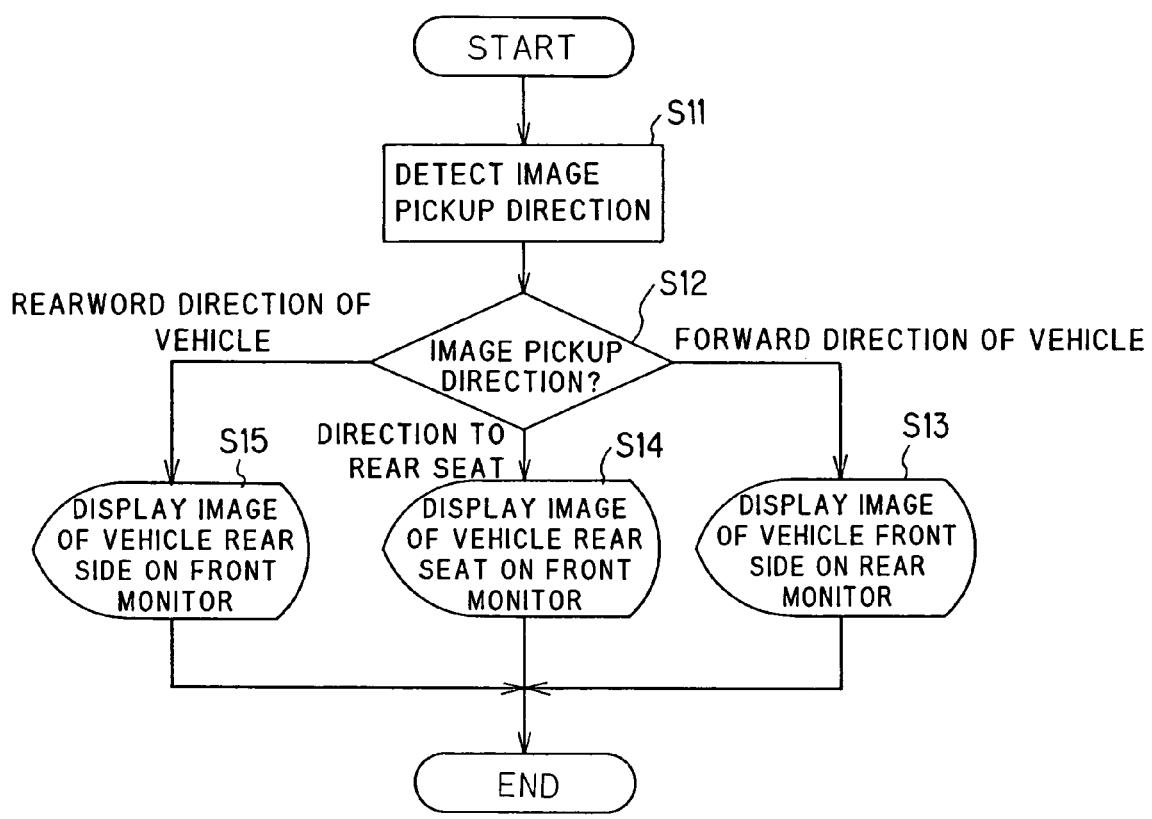
FIG. 5 is a flowchart showing the processing of a second embodiment.
Figure 6:
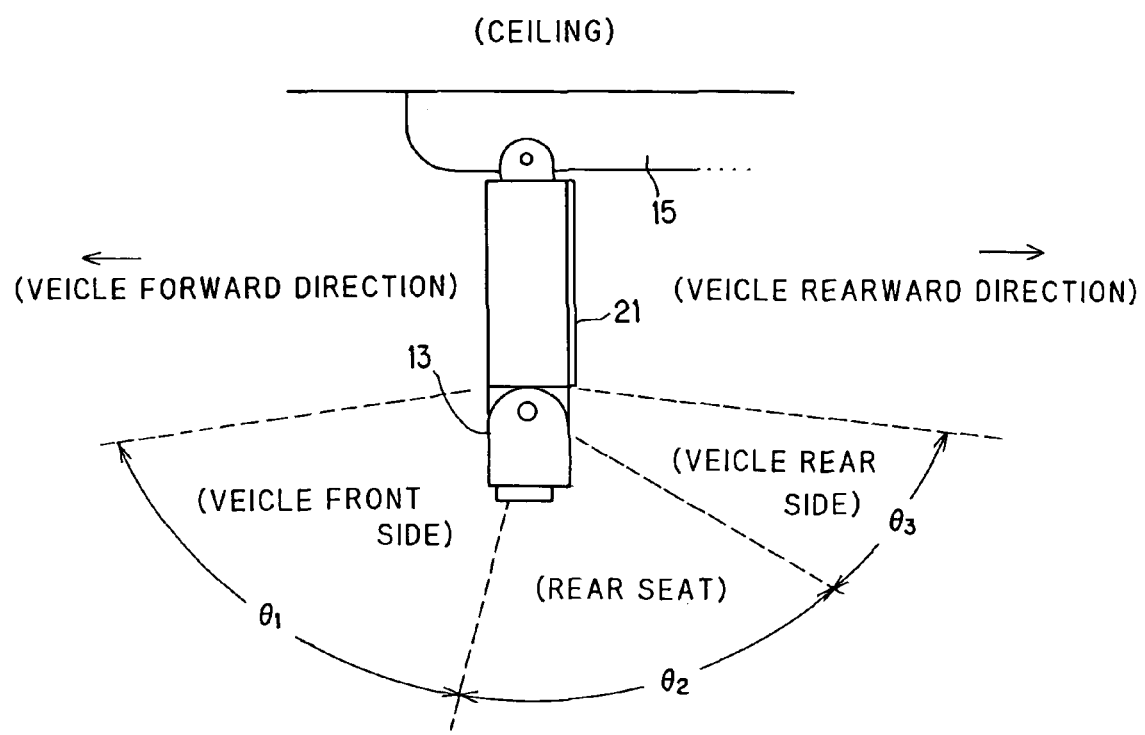
FIG. 6 is a diagram showing an image pickup direction.

DESCRIPTION OF REFERENCE NUMERALS 10 in-vehicle mount display system
11 vehicle
12 front monitor
13 camera
14 rear monitor unit
15 rear monitor unit body
21 rear monitor
22 controller
23 player portion
24 image pickup direction detector

The invention claimed is:

1. An in-vehicle mount display control device for controlling plural monitors on which a picked-up image from a camera is displayed, the in-vehicle mount display control device comprising:
a display controller for selecting a monitor of the plural monitors on a basis of an image pickup direction of the camera and displaying the picked-up image of the camera on the selected monitor.

2. The in-vehicle mount display control device according to claim 1, wherein the display controller comprises a signal switching portion for switching a monitor of an output destination of an image pickup signal of the camera on a basis of an image pickup direction signal corresponding to the image pickup direction of the camera.

3. The in-vehicle mount display control device according to claim 1, wherein the display controller selects the monitor on a basis of whether the image pickup direction is any one of a forward direction of a vehicle, a direction to a rear seat, and a rearward direction of the vehicle.

4. The in-vehicle mount display control device according to claim 1, wherein the camera is secured to a neighborhood of a ceiling portion in a vehicle.

5. An in-vehicle mount display system, comprising:
a camera;
plural monitors;
an image pickup direction detector for detecting an image pickup direction of the camera and outputting an image pickup direction signal; and
a display controller for selecting a monitor of the plural monitors on a basis of the image pickup direction signal, and displaying a picked-up image of the camera on the selected monitor.

6. The in-vehicle mount display system according to claim 5, wherein the display controller comprises a signal switching portion for switching a monitor of an output destination of the image pickup signal of the camera on a basis of the image pickup direction signal.

7. The in-vehicle mount display control system according to claim 5, wherein the display controller selects a monitor on a basis of a forward direction of a vehicle, a direction to a rear seat, and a rearward direction of the vehicle as the image pickup direction.

8. A method of controlling an in-vehicle mount display system having a camera and plural monitors on which picked-up images of the camera are displayed, said method comprising:
identifying an image pickup direction of the camera; and
selecting a monitor of the plural monitors on a basis of the image pickup direction thus identified and displaying the picked-up images of the camera on the selected monitor.

9. A method for controlling an in-vehicle mount display system having a camera and plural monitors on which picked-up images of the camera are displayed, the method comprising:
identifying, as performed in a processor, an image pickup direction of the camera; and
selecting, as performed in the processor, a monitor of the plural monitors on a basis of the image pickup direction thus identified, and displaying the picked-up images of the camera on the selected monitor.

10. The method according to claim 9, wherein the monitor is selected on a basis of whether the image pickup direction is any one of a forward direction of a vehicle, a direction to a rear seat, and a rearward direction of the vehicle.

11. A non-transitory computer-readable storage medium, tangibly embodying a program of instructions executable by a computer to perform a method for controlling an in-vehicle mount display system having a camera and plural monitors on which picked-up images of the camera are displayed, the method comprising:
identifying an image pickup direction of the camera;
selecting a monitor of the plural monitors on a basis of the image pickup direction; and
displaying the picked-up images of the camera on the selected monitor.

* * * * *